3,457,212
ANAEROBIC CURABLE COMPOSITIONS
Yukio Fukuoka, Ikeda-shi, and Senji Kusayama and Mamoru Suzuki, Toyonaka-shi, Japan, assignors to Sumitomo Chemical Company, Ltd., Higashi-ku, Osaka, Japan, a corporation of Japan
No Drawing. Filed Aug. 8, 1966, Ser. No. 570,754
Claims priority, application Japan, Aug. 17, 1965, 40/50,054
Int. Cl. C08f 11/02, 45/72
U.S. Cl. 260—31.4
6 Claims

ABSTRACT OF THE DISCLOSURE

A composition is provided which can be maintained in an unpolymerized state in the presence of air but can rapidly be polymerized to solidify when placed in a space between screws or fitted parts and maintained free from air therein. Said composition is used mainly as a material for preventing screws or fits from loosening or as a sealant. A composition consisting of a compound having the structural formula:

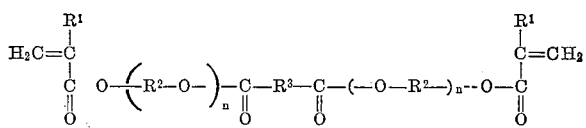

and a hydroperoxide has the properties which meet the above-mentioned requirements. Further, the addition of a polyhydric alcohol enables said composition to be maintained in an unpolymerized state for a prolonged period of time in the presence of air. Moreover, the addition of a tertiary amine to the above three-component composition enables polymerization in the absence of air to be more rapidly caused without losing the characteristics properties of the above three-component composition. A bis(methoxyethyl glycol) phthalate may be added to the above four-component composition as a plasticizer which can soften the solidified resin without impairing the properties of the four-component composition but does not cause migration or separation due to incompatibility. A composition consisting mainly of a compound having the above-mentioned structural formula can advantageously seal complementary parts made of Cd or Zn and the resulting seal has a good heat-resistance.

---

The present invention relates to an improvement of anaerobic curable compositions, and more particularly, to anaerobic curable compositions comprising a polyhydric alcohol as a stabilizer, an anaerobic monomer represented by the formula:

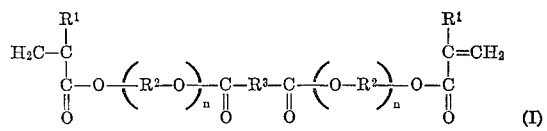 (I)

wherein $R^1$ represents hydrogen, chlorine, methyl or ethyl, $R^2$ represents

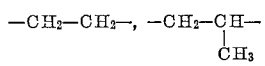

or —$CH_2$—$CH_2$—$CH_2$—, $R^3$ represents $(CH_2)_m$, wherein $m$ is an integer from 0 to 8,

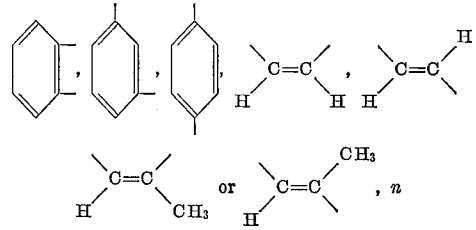

$n$ represents an integer from 1 to 4, and an organic hydroperoxide having a sufficient ability to effect a polymerization of said compound in the absence of oxygen. The present compositions may further contain an organic tertiary amine as a curing promoter.

As the prior art, U.S. Patents No. 2,895,950 and No. 2,628,178 and U.K. Patent No. 965,826 disclose that a compound represented by the general formula:

$$H_2C=C-C-O-[(CH_2)_m-(\overset{H}{\underset{R''}{C}})_p-\overset{R}{\underset{H}{C}}-O]_n-\overset{O}{C}-C=CH_2$$
      $R'$                                    $R'$ wherein R is a member selected from the class consisting of hydrogen,

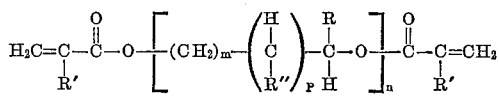

R' is a member selected from the class consisting of hydrogen, chlorine, —$CH_3$ and —$C_2H_5$; R'' is a member selected from the class consisting of hydrogen,

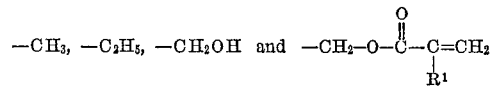

$m$ is an integer equal to at least 1; $n$ is an integer equal to at least 2; and $p$ is 0 or 1, such as an oxygenated product of diethylene glycol dimethacrylate or a mixture of said compound with a hydroperoxide catalyst may be suddenly polymerized if the presence of oxygen is interrupted. Such compounds represented by the above-mentioned general formula are called anaerobic monomers. These anaerobic monomers polymerize in the absence of air into rigid polymers which are suitable as a locking for a screwed part, a holder for a fitting or a sealer for a high pressure liquid or gas. However, the thermal stability of those polymers is not satisfactory when they are employed for such a high temperature body as an engine or the like. The shear strength of the polymers is also too small to be employed for a zinc- or cadmium-plated screw.

An object of the present invention is to provide improved anaerobic curable compositions comprising monomers which may produce polymers having a good thermal stability.

Another object of the invention is to provide anaerobic curable compositions which are particularly suitable for use in a zinc- or cadmium-plated screw.

Still another object of the invention is to provide sealants having a longer shelf life.

According to the present invention, a composition may be obtained by incorporating 0.01 to 10 percent by weight of an organic hydroperoxide and 0.01 to 10 percent by weight of a polyhydric alcohol into an anaerobic monomer represented by the above-mentioned Formula I, based upon the weight of said anaerobic monomer. Further 0.1 to 20 percent by weight of an amine may be incorporated, if necessary.

Still further desired intermediate rotary escape torque value can be obtained by the addition of plasticiser. The preferred plasticisers are phthalate esters of glycol. The plasticiser, for example, includes bis(methyl glycol) phthalate, bis(ethyl glycol) phthalate, bis(butyl glycol) phthalate, bis(methoxyethyl glycol) phthalate, bis(butoxyethyl glycol)phthalate and the like.

The monamer represented by the above-mentioned Formula I may be readily synthesized by a conventional esterification reaction in the presence of a hydroquinone from one mole of a dicarboxylic acid or an anhydride thereof represented by the general formula:

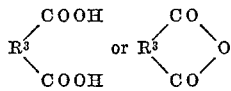

about two moles of an acrylic acid derivative represented by the general formula

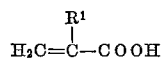

and about two moles of a dihydric alcohol represented by the general formula: $HO(R^2-O)_n-H$, wherein $R^1$, $R^2$, $R^3$ and $n$ are as defined above.

The monomers represented by the above-mentioned Formula I which may be employed in the present invention include dimethacrylate bis(ethylene glycol)phthalate of the formula:

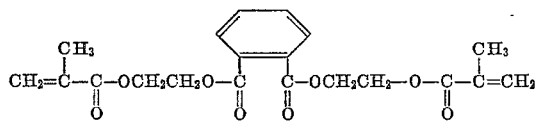

dimethacrylate bis (ethylene glycol) - oxalate, dimethacrylate bis (ethylene glycol) - malonate, dimethacrylate bis (ethylene glycol) - adipate, dimethacrylate bis (ethylene glycol) - sebacinate and dimethacrylate bis (ethylene glycol) - maleate as well as dimethacrylate bis (diethylene glycol) - phthalate and dimethacrylate bis (tetraethylene glycol) - phthalate. Malonate, adipate, sebacinate, maleate, etc. thereof may also be used. Also, said dimethacrylates may be replaced by diacrylates or α-chloroacrylates. When the monomers represented by the Formula I are used alone, their storage stability is poor.

The organic hydroperoxides which may be employed in the present invention include cumene hydroperoxide, methyl ethyl ketone hydroperoxide, cyclohexene hydroperoxide, 2-methylbutene-1 hydroperoxide, ethyl ether hydroperoxide, cetane hydroperoxide, ethylene glycol dimethyl ether hydroperoxide, diethylene glycol hydroperoxide, tetrahydronaphthalene hydroperoxide, tetrahydrocarbazoyl hydroperoxide, methyl n-amyl ketone hydroperoxide, methyl n-hexyl ketone hydroperoxide, tert.-butyl hydroperoxide and the like.

The polyhydric alcohols improve the storage stability of the monomers represented by the Formula I and include, for example, ethylene glycol, diethylene glycol, triethylene glycol and glycerol. These polyhydric alcohols generally have a solubility of about 5 to 10 percent by weight in the monomers (I). As described above, the alcohols are used in an amount of 0.01 to 10 percent by weight and preferably 0.5 to 1 percent by weight of the monomers (I). When the amount of the alcohols used is not more than 10 percent by weight but more than said solubility, the alcohols may be dissolved in a compound which is soluble in said monomer and can dissolve said polyhydric alcohol and is copolymerizable with said monomer. Such compounds include acrylic acid, methacrylic acid and esters thereof such as ethyl methacrylate, n-butyl methacrylate, lauryl methacrylate, 2-hydroxyethyl methacrylate and glycidyl methacrylate. Also, the polyhydric alcohols may be dissolved in dimethyl phthalate, toluene or acetone.

The amines include, for example, triethylamine, tripropylamine, tributylamine, triamylamine, dimethylaniline, ethyldiethanolamine, triethanolamine and piperidine. They serve for the improvement of the monomer's stability.

Also, an unsaturated monomer such as styrene, butadiene and the like may be incorporated into the compositions of the present invention in addition to the monomers as enumerated above as a solvent for the polyhydric alcohols.

The anaerobic curable compositions of the present invention will be cured in about 24 to 48 hours and form desired rigid resins, if air is removed.

The following examples illustrate the present invention. But it is not intended to limit the invention. Percents and parts are by weight.

STORAGE STABILITY

Example 1

Compositions of dimethacrylate bis (ethylene glycol)-phthalate and 5 percent of cumene hydroperoxide or dimethylbenzyl hydroperoxide and 80, 200 and 300 p.p.m., respectively, of 1,4-benzoquinone or 100, 200 and 400 p.p.m., respectively, of hydroquinone as a polymerization inhibitor were respectively placed in a polyethylene container and aged at 50° C. They were cured into solids in about 5 to 7 hours for 1,4-benzoquinone and in about 1 to 2 hours for hydroquinone, and showed an undesirably low storage stability.

On the other hand, a composition of the same formulation as above except containing 5 percent of ethylene glycol in addition to 80 p.p.m. of 1,4-benzoquinone showed a stability not less than 12 days when the composition was aged at 50° C. Compositions of the same formulation as above except containing 2.5, 1 and 0.5 percent, respectively, of ethylene glycol in addition to 200 p.p.m. of 1,4-benzoquinone were stable for 12 to 14 days.

Further, compositions of the same formulation as above except containing respectively 5 percent of diethylene glycol and 5 percent of glycerol in addition to 200 p.p.m. of 1,4-benzoquinone were stable for six days and for seven days respectively when they were aged at 50° C.

Example 2

A composition of dimethacrylate bis (ethylene glycol)-malonate and 5 percent of cumene hydroperoxide and 80 p.p.m. of 1,4-benzoquinone was aged at 50° C. The composition was cured into a solid in two hours. On the other hand, a composition of the same formulation as above containing additionally 5 percent of ethylene glycol maintained its liquid state for 10 days when it was aged at 50° C.

Also a composition of the same formulation as above except that dimethacrylate bis (ethylene glycol)-malonate was replaced by dimethacrylate bis (diethylene glycol)-phthalate was cured into a solid in 15 hours at room temperature. On the other hand, a composition of the formulation containing additionally 5 percent of ethylene glycol maintained its liquid state for 10 days when it was aged at 50° C.

Example 3

A composition consisting of dimethacrylate bis (ethylene glycol)-maleate and 5 percent of cumene hydroperoxide and 80 p.p.m. of 1,4-benzoquinone gelled in 10 minutes at ordinary temperature. On the other hand, a composition of the same formulation as above containing additionally 5 percent of ethylene glycol maintained its liquid state for 10 days when it was aged at 50° C.

Also a composition of the same formulation as above except that dimethacrylate bis (ethylene glycol)-maleate was replaced by dimethacrylate bis (ethylene glycol)-adipate gelled in 30 minutes at ordinary temperature. On the other hand, a composition of the formulation containing additionally 5 percent of ethylene glycol maintained its liquid state for 12 days when it was aged at 50° C.

In each of the above examples the storage stability under a severe condition at 50° C. has been described, but the stability will be of course improved at room temperature.

EFFECT OF AMINE

Example 4

A composition consisting of dimethacrylate bis (ethylene glycol)-phthalate, 5 percent of cumene hydroperoxide, 80 p.p.m. of 1,4-benzoquinone, 2 percent of ethylene glycol and 2 percent of triethylamine was stable for 13 days or more when it was aged at 50° in the presence of air.

Several drops of this composition were dropped on the screw thread of 3/8 inch bolt-nut and the bolt and nut were assembled and then aged for 24 hours at room temperature. The rotary escape torque thus produced by this composition was found to be 2 kg.-m. Also, when the same composition was dropped on the screw thread and the bolt was clamped at 1 kg.-m., the composition was cured in two hours, producing an escape torque of 1.5 kg.-m., and produced an escape torque of 2 kg.-m. after 24 hours. Unless the amine was added to the composition, the composition was not cured even after 24 hours.

Example 5

A composition of the same formulation as in Example 4 except that the amount of ethylene glycol was 1 percent showed a similar effect in its storage stability and, for the same 3/8 inch bolt-nut, produced a rotary escape torque of 1.4 kg.-m. after two hours and produced that of 2.3 kg.-m. after 24 hours.

Also, a composition of the formulation as in Example 4 except triethylamine was replaced by 2 percent of dimethylaniline was stable for 15 days and produced a rotary escape torque of 2 kg.-m. after 24 hours.

Example 6

A composition of the same formulation as in Example 4 except that triethylamine was replaced by 2 percent of triethanolamine was stable for 13 days when it was aged at 50° C.

When the composition was dropped on bolt-nut in the same manner as in Example 4 and the bolt and nut were assembled and aged for 24 hours, a rotary escape torque of 1.4 kg.-m. was produced.

Also, a composition of the similar formulation except that the amount of ethylene glycol was reduced to 1 percent yielded the same stability and rotary escape torque as described above.

Example 7

Compositions of the same formulation as in Example 4 except that ethylene glycol was replaced by 1 percent of diethylene glycol and by 1 percent of glycerol, respectively, were stable for 6 days and for 7 days, respectively, when they were aged at 50° C.

Also, when they were dropped on bolt-nut in the same manner as in Example 4 and the bolt and nut were assembled, the compositions produced a rotary escape torque of 2 kg.-m. and that of 1.8 kg.-m. after two hours and produced that of 3 kg.-m. and that of 2.5 kg.-m. after 24 hours, respectively.

Example 8

A composition consisting of dimethacrylate bis (ethylene glycol)-malonate, 5 percent of cumene hydroperoxide, 80 p.p.m. of 1,4-benzoquinone, 1 percent of ethylene glycol and 2 percent of triethylamine was stable for 15 days when it was aged at 50° C.

Also, when the composition was dropped on the screw of 3/8 inch bolt-nut and the bolt and nut were assembled and aged for 24 hours at room temperature, the composition produced a rotary escape torque of 2 kg.-m.

Example 9

Compositions of the same formulation as in Example 8 except that dimethacrylate bis (ethylene glycol)-malonate was replaced by dimethacrylate bis (ethylene glycol)-maleate and by dimethacrylate bis (ethylene glycol)-adipate, respectively, were stable for 15 days and for 13 days, respectively, and showed an escape torque of 2.6 kg.-m. and that of 1 kg.-m., respectively, after aging them for 24 hours.

Example 10

A composition of the same formulation as in Example 8 except that dimethacrylate bis (ethylene glycol)-malonate was replaced by dimethacrylate bis (diethylene glycol)-phthalate maintained its liquid stage for 12 days when it was aged at 50° C. The composition also showed a rotary escape torque of 2.3 kg.-m. after aging it for 24 hours.

HEAT STABILITY OF POLYMER

Example 11

When several drops of a composition consisting of 92 parts of dimethacrylate bis (ethylene glycol)-phthalate, 5 parts of cumene hydroperoxide, 1 part of ethylene glycol and 2 parts of triethylamine were dropped on the screw thread of 3/8 inch bolt-nut and the bolt and nut were assembled and then aged for 24 hours at room temperature, a rotary escape torque of 2.3 kg.-m. was produced. The bolt and nut were further heated at 150° C. for 3 hours in a heating oven and then taken out and tested within 30 seconds. Thus the improvement of their strength was observed showing a rotary escape torque of 3.6 kg.-m.

Also, when the bolt and nut were treated with compositions of the same formulation as above except that dimethacrylate bis (ethylene glycol)-phthalate was replaced by dimethacrylate bis (diethylene glycol)-phthalate, dimethacrylate bis (ethylene glycol)-maleate and dimethacrylate bis (ethylene glycol)-adipate, respectively, in the same manner as described above and then were aged for 24 hours, a rotary escape torque of 2.3 kg.-m., 2.6 kg.-m. and 1 kg.-m., respectively, was produced. Further after-heat treatment gave an improvement of their strength, showing a rotary escape torque of 3.2 kg.-m., 3.1 kg.-m. and 1.6 kg.-m., respectively.

On the other hand, when the bolt and nut were treated with a known anaerobic curable composition consisting of 93 parts of tetraethylene glycol dimethacrylate, 2 parts of triethylamine and 5 parts of cumene hydroperoxide in the same manner as described above and then were aged for 24 hours, a rotary escape torque of 2.5 kg.-m. was produced. However, after-heat treatment resulted in the decrease of their strength, showing a rotary escape torque of 2.2 kg.-m.

APPLICATION TO Zn- AND Cd- PLATED BOLT-NUT

Example 12

A composition consisting of dimethacrylate bis (ethylene glycol)-phthalate, 2 percent by weight of triethylamine, 0.5 percent by weight of ethylene glycol and 5 percent by weight of cumene hydroperoxide and a composition consisting of tetraethylene glycol dimethacrylate, 2 percent by weight of triethylamine and 7 percent by weight of cumene hydroperoxide were respectively applied on 3/8 inch cadium- and zinc- plated bolts-nuts and the bolts and nuts were then assembled. After six hours their rotary escape torques were measured. The results thus obtained were as follows:

Rotary escape torques (kg.-m.)

| | Composition containing dimethacrylate bis (ethylene glycol)-phthalate | Composition containing tetraethylene glycol dimethacrylate |
|---|---|---|
| Cd-plated bolt-nut (kg.-m.) | 2.29 | 0.98 |
| Zn-plated bolt-nut (kg.-m.) | 2.82 | 0.63 |

Example 13

A base composition was prepared by mixing 90.5 parts of the dimethylacrylate bis (ethylene glycol) phthalate, 0.5 part of ethylene glycol, 5 parts of cumene hydroperoxide and 4 parts of triethylamine. To the composition were added various amounts of bis (methoxyethyl glycol) phthalate and the resultant mixtures were applied to ⅜" 24 U.N.F. 2 bright mold steel bolts. A nut was then screwed on to the shank of each bolt but not seated and the assembly was allowed to cure for 24 hours. At the end of this period the force required to rotate each nut on the bolt shank was measured using a torque spanner. The results are shown in the following table:

| Bis(methoxyethyl glycol)phthalate content (parts per 100) | Rotary escape torque (kg.-m.) |
|---|---|
| 0 | 2.5 |
| 10 | 1.5 |
| 20 | 1.1 |
| 40 | 0.8 |

What we claim is:

1. An anaerobic curable composition comprising 0.01 to 10 percent by weight of an organic hydroperoxide selected from the group consisting of cumene hydroperoxide, 2-methyl-butene-1 hydroperoxide, cyclohexene hydroperoxide, methyl ethyl ketone hydroperoxide, ethyl ether hydroperoxide, ethylene glycol dimethyl ether hydroperoxide, diethylene glycol hydroperoxide, tetrahydronaphthalene hydroperoxide, tetrahydrocarbazoyl hydroperoxide, methyl n-amyl ketone hydroperoxide, methyl n-hexyl ketone hydroperoxide and tert.-butyl hydroperoxide; 0.01 to 10 percent by weight of a polyhydric alcohol selected from the group consisting of ethylene glycol, diethylene glycol, triethylene glycol and glycerol; and a monomer represented by the formula:

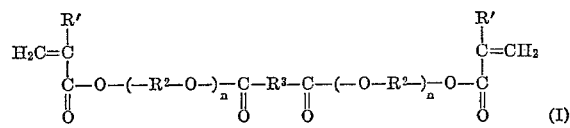

wherein R' represents hydrogen, chlorine, methyl or ethyl, R² represents

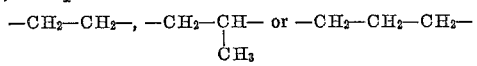

R³ represents —(—CH₂—)$_m$— in which $m$ is an integer of from 0 to 8,

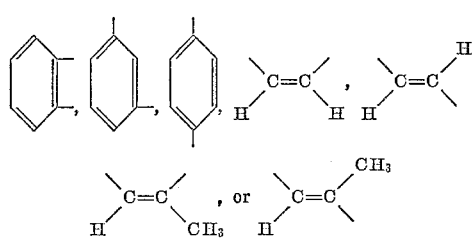

and $n$ represents an integer of from 1 to 4, the amounts of organic hydroperoxide and polyhydric alcohol being based on the weight of the monomer of the Formula I.

2. A composition according to claim 1, wherein said monomer of the Formula I is selected from the group consisting of dimethacrylate bis(ethylene glycol) phthalate, dimethacrylate bis(ethylene glycol) oxalate, dimethacrylate bis(ethylene glycol) malonate, dimethacrylate bis(ethylene glycol) adipate, dimethacrylate bis (ethylene glycol) sebacinate, dimethacrylate bis(ethylene glycol) maleate, dimethacrylate bis(diethylene glycol) phthalate, dimethacrylate bis(tetraethylene glycol) phthalate, dimethacrylate bis(tetraethylene glycol) malonate, dimethacrylate bis(tetraethylene glycol) adipate, dimethacrylate bis(tetraethylene glycol) sebacinate, dimethacrylate bis(tetraethylene glycol) maleate, and the diacrylates and α-chloroacrylates corresponding to said dimethacrylates.

3. A composition according to claim 1, further comprising a plasticizer, as a moderator, selected from the group consisting of bis-(methyl glycol) phthalate, bis (ethyl glycol) phthalate, bis(butyl glycol) phthalate, bis (methoxyethyl glycol) phthalate and bis(butoxyethyl glycol) phthalate.

4. An anaerobic curable composition comprising 0.01 to 10 percent by weight of an organic hydroperoxide selected from the group consisting of cumene hydroperoxide, 2-methyl-butene-1 hydroperoxide, cyclohexene hydroperoxide, methyl ethyl ketone hydroperoxide, ethyl ether hydroperoxide, ethylene glycol dimethyl ether hydroperoxide, diethylene glycol hydroperoxide, tetrahydronaphthalene hydroperoxide, tetrahydrocarbazoyl hydroperoxide, methyl n-amyl ketone hydroperoxide, methyl n-hexyl ketone hydroperoxide and tert.-butyl hydroperoxide; 0.01 to 10 percent by weight of a polyhydric alcohol selected from the group consisting of ethylene glycol, diethylene glycol, triethylene glycol and glycerol; a monomer represented by the formula:

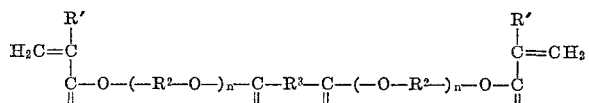

wherein R' represents hydrogen, chlorine, methyl or ethyl, R² represents

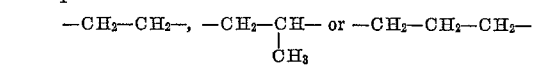

R³ represents —(—CH₂—)$_m$— in which $m$ represents an integer of from 0 to 8,

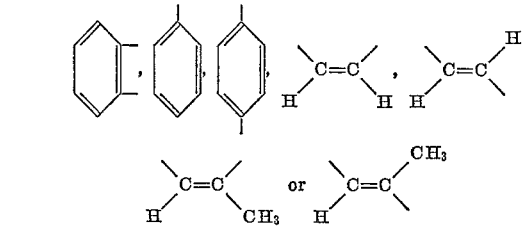

and $n$ represents an integer of from 1 to 4, the amounts of organic hydroperoxide and polyhydric alcohol being based on the weight of the monomer of the Formula I; and 0.1 to 20 percent by weight, based on the total weight of the organic hydroperoxide, the polyhydric alcohol and the monomer, of an amine selected from the group consisting of triethylamine, tripropylamine, tributylamine, triamylamine, dimethylaniline, ethyldiethanolamine, triethanolamine and piperidine.

5. A composition according to claim 4, wherein said monomer having the Formula I is selected from the group consisting of dimethacrylate bis(ethylene glycol) phthalate, dimethacrylate bis(ethylene glycol) oxalate, dimethacrylate bis(ethylene glycol) malonate, dimethacrylate bis(ethylene glycol) adipate, dimethacrylate bis (ethylene glycol) sebacinate, dimethacrylate bis(ethylene glycol) maleate, dimethacrylate bis(diethylene glycol) phthalate, dimethacrylate bis(tetraethylene glycol) phthalate, dimethacrylate bis-(tetraethylene glycol) malonte, dimethacrylate bis(tetraethylene glycol) adipate, dimethacrylate bis(tetraethylene glycol) sebacinate, dimethacrylate bis(tetraethylene glycol) maleate, and the diacrylates and α-chloroacrylates corresponding to said dimethacrylates.

6. A composition according to claim 4, which further contains a plasticizer, as a moderator, selected from the group consisting of bis-(methyl glycol) phthalate, bis (ethyl glycol) phthalate, bis(butyl glycol) phthalate, bis (methoxyethyl glycol) phthalate, and bis(butoxyethyl glycol) phthalate.

(References on following page)

References Cited

UNITED STATES PATENTS

| | | | |
|---|---|---|---|
| 2,459,746 | 1/1949 | Radcliffe | 260—45.95 |
| 2,999,841 | 9/1961 | Csendes | 260—45.95 |
| 2,427,071 | 9/1947 | Reuter | 260—45.95 |
| 3,282,891 | 11/1966 | Bown | 260—45.95 |
| 2,628,178 | 2/1953 | Burnett | 260—89.5 |
| 2,895,950 | 7/1959 | Krieble | 260—89.5 |

OTHER REFERENCES

Buttery Plasticizers, 1947, p. 22.

MORRIS LIEBMAN, Primary Examiner

H. H. FLETCHER, Assistant Examiner

U.S. Cl. X.R.

260—31.8, 32.6, 33.2, 33.4, 45.95